United States Patent
Schooley

(10) Patent No.: US 6,753,770 B2
(45) Date of Patent: Jun. 22, 2004

(54) VEHICLE SIGNALING SYSTEM

(76) Inventor: Ronald L. Schooley, P.O. Box 552, Grove City, OH (US) 43123

(*) Notice: Subject to any disclaimer, the term of this patent is extended or adjusted under 35 U.S.C. 154(b) by 52 days.

(21) Appl. No.: 10/228,936

(22) Filed: Aug. 27, 2002

(65) Prior Publication Data

US 2004/0041701 A1 Mar. 4, 2004

(51) Int. Cl.[7] .................................... B60Q 1/26
(52) U.S. Cl. .................. 340/468; 340/470; 340/332
(58) Field of Search ............................ 340/468–470, 340/471, 331–332

(56) References Cited

U.S. PATENT DOCUMENTS

| | | |
|---|---|---|
| 4,713,584 A | 12/1987 | Jean |
| 5,420,480 A | 5/1995 | Knepel et al. |
| 5,473,306 A | 12/1995 | Adell |
| 5,767,589 A | 6/1998 | Lake et al. |
| 5,900,679 A | 5/1999 | Lake et al. |
| 6,031,451 A | 2/2000 | Graves et al. |
| 6,087,932 A * | 7/2000 | Belgard ............... 340/468 |
| 6,097,156 A | 8/2000 | Diep |
| 6,154,127 A | 11/2000 | Lee et al. |
| 6,177,865 B1 | 1/2001 | Bryant et al. |
| 6,201,318 B1 | 3/2001 | Guillory |

* cited by examiner

Primary Examiner—Daryl Pope
(74) Attorney, Agent, or Firm—David J. Dawsey; Michael J. Gallagher; Gallagher & Dawsey Co., L.P.A.

(57) ABSTRACT

A vehicle signaling system allowing selective and independent illumination of a vehicle's headlight and taillight systems. The vehicle signaling system may be made part of new vehicle manufacture, or a retrofit installation. The selective and independent illumination allows an overtaking vehicle and an overtaken vehicle to safely signal each other by means of independently activating and deactivating the headlight and taillight systems. The vehicle signaling system is connected into the vehicle's power source and ground, and incorporates a means for intermittently and independently activating and deactivating the headlight system and the taillight system, and may include a remote auxiliary means for activating the systems. An electrical circuit controlling means accepts a plurality of inputs and produces a plurality of outputs used to either interrupt, or supply, power to the headlight and taillight systems. The electrical circuit controlling means may include an integrated circuit.

4 Claims, 1 Drawing Sheet

VEHICLE SIGNALING SYSTEM

TECHNICAL FIELD

The present invention relates to the field of vehicle signaling systems; particularly, to a device for conveniently and independently activating and deactivating vehicle headlights and taillights to signal other vehicles, regardless of whether the headlights or taillights are presently illuminated.

BACKGROUND OF THE INVENTION

Due to the nature of their design, certain vehicles, particularly trucks, are inherently relatively large, long, heavy, slow to accelerate and decelerate, and give their operator limited fields of visibility, especially to the rear. As a result, a persistent problem exists in the operation of trucks upon the roadways, particularly on highways. When a truck overtakes and passes another vehicle, particularly another truck, it is difficult for the passing truck operator, who generally must rely only on his or her rear view mirrors, to accurately gauge when the operator's truck has fully passed the vehicle that it has overtaken. Such a determination is critical to deciding when it is safe to pull back into the rightwards lane in front of the overtaken vehicle. Errors made in this determination are literally life threatening.

To cope with this problem, an informal system has developed among truck drivers to signal each other when it is safe to pull back into the rightward lane in front of an overtaken vehicle. The driver of the overtaken vehicle carefully observes the progress of the passing truck and notes when it has passed his or her own vehicle with a safe margin of distance for the overtaking truck to return to the rightward lane. The driver then flashes his or her lights a few times, so that the driver of the overtaking truck, seeing the flash in his or her rear view mirrors, will know that it is safe to pull back in front of the overtaken vehicle. The driver of the overtaking vehicle then flashes his or her lights, both to acknowledge the safe passing signal and to express a "thank you" for the courtesy shown by the overtaken driver. A driver on essentially any highway can see this ritual repeated hundreds of times in a single evening.

This informal system, while widely used, is not free from drawbacks that are both inconvenient and potentially dangerous. In the daytime, it is necessary for both the overtaken and overtaking vehicles to first energize their vehicles lighting system, before being able to perform the signaling steps. This extra step is another demand on the driver's attention, which may cause accidents. If the driver chooses to turn off his or her lighting system, after a daytime signal, yet another possibly attention diverting maneuver is required. If a driver leaves the lighting system energized in the daytime after a signal, extra operating time is placed on the light bulbs, additional energy is consumed thereby reducing fuel economy, and the vehicle batteries may be drained if the vehicle is shut down without turning off the lighting system.

At night, another complication is present. Since the traditional lighting system control activates both the headlights and taillights at the same time, and often the running lights, the driver flashing his or her lights must turn on and off both the front headlights and rear taillights of the vehicle, even though the signaling maneuver requires that only the headlights or taillights be flashed. For example, the overtaken vehicle, needing only to flash its headlights, must turn on and off its taillights also. This can cause the overtaken vehicle to appear to temporarily disappear, on a dark roadway, to other vehicles behind it, as for a period of time the vehicle is traveling with no lights on. Other drivers may be startled by the sudden apparent disappearance of a large truck in front of them. Similarly, the overtaking truck, needing only to flash its taillights to acknowledge and thank the overtaken driver, must of necessity flash its headlights as well. The sudden loss of forward illumination can cause the driver of the overtaking truck to momentarily lose sight of the roadway, and any objects upon it, which can be extremely dangerous. The sudden flashing of headlights can also alarm drivers in an opposing flow of traffic.

Both the interruption of the taillights of the overtaken vehicle and the interruption of the headlights of the overtaking vehicle are entirely unnecessary to the signaling ritual, and are necessitated solely by the traditional wiring of vehicle lighting systems.

Alternatives for signaling are used but possess serious drawbacks. Horn signals may be difficult to hear, may startle other drivers in close proximity, and create adverse unnecessary noise. Citizens band radios, which are not universally carried in all vehicles, may be used, but reception and transmission can be problematic depending on various factors, including weather conditions and others' use of the potentially crowded airwaves.

What continues to be needed but is missing from the field of vehicle signaling systems is a device that improves transportation safety by allowing a driver to conveniently signal other drivers utilizing activating and deactivating headlights and taillights independently of other vehicle lighting. Further, the device must be easy to incorporate as either an original equipment manufacturer lighting system or as an aftermarket retrofit device, and must be easy to fabricate to ensure that it is economical. While some of the prior art devices attempted to improve various aspects of the state of the art of vehicle lighting systems, none has achieved the cost optimized capability of the present invention, which is easy to fabricate and convenient to use. With these capabilities taken into consideration, the instant invention addresses many of the shortcomings of the prior art and offers significant benefits heretofore unavailable.

SUMMARY OF INVENTION

In its most general configuration, the present invention advances the state of the art with a variety of new capabilities and overcomes many of the shortcomings of prior devices in new and novel ways. In its most general sense, the present invention overcomes the shortcomings and limitations of the prior art in any of a number of generally effective configurations.

A primary objective of the present invention is to allow selective, and independent, illumination of a vehicle's headlight system, including at least one set of headlights, and a vehicle's taillight system, including at least one set of taillights and optional running lights, regardless of whether the headlight and taillight systems are illuminated. The vehicle signaling system of the present invention may be applied to existing vehicles in a retrofit type of installation, or may be incorporated into the design and manufacture of new vehicles. Similarly, it may be incorporated into trailer lighting systems including, but not limited to, camper trailers, boat trailers, livestock trailers, and equipment trailers.

The selective, and independent, illumination allows an overtaking vehicle and an overtaken vehicle to conveniently and safely signal each other by activating and deactivating the headlight system and the taillight system. The present invention may connect into a vehicle's power source, a vehicle grounding system, a headlight system actuation means, and a taillight system actuation means. Such connections may be easily incorporated into existing vehicles.

In one of the many preferable configurations, the vehicle signaling system incorporates, among other elements, a means for intermittently and independently activating and deactivating the headlight system and the taillight system, a means for continuously activating and deactivating the headlight system and the taillight system, a means for obtaining power from the vehicle power system, an electrical circuit means for controlling the headlight system and the taillight system by electrically connecting the intermittent activation and deactivation means, the continuous activation and deactivation means, and the power attaining means, and a means for electrically interfacing the electrical circuit controlling means to the headlight system and the taillight system.

In one particular embodiment, the means for intermittently and independently activating and deactivating the headlight and taillight system may incorporate a two position non-locking switch having a headlight system flash position, a flash OFF position, and a taillight system flash position. Simply moving the switch from the flash OFF position to the headlight system flash position and holding the switch, then letting it return to the flash OFF position will flash the headlight system whether or not the headlight system is presently illuminated, and without having any effect on the illumination of the taillight system. For example, at night when the headlight system and taillight system are illuminated, such action will de-energize the headlights when the switch is held in the headlight system flash position, yet the taillight system will remain illuminated and unaffected by the action. Likewise, during the daytime, movement of the switch to the headlight system flash position results in the intermittent illumination of the headlight system, again without affecting the taillight system.

Alternatively, simply moving the switch from the flash OFF position to the taillight system flash position and holding the switch, then letting it return to the flash OFF position, will flash the taillight system whether or not the taillight system is presently illuminated, and without having any effect on the illumination of the headlight system. For example, at night when the headlight system and taillight system are illuminated, such action will de-energize the taillight system when the switch is held in the taillight system flash position, yet the headlight system will remain illuminated and unaffected by the action. Likewise, during the daytime, movement of the switch to the taillight system flash position results in the intermittent illumination of the taillight system, again without affecting the headlight system.

An additional variation of the present invention includes an auxiliary means for intermittently and independently activating and deactivating the headlight system and the taillight system. The auxiliary means for intermittently and independently activating and deactivating the headlight and taillight system may incorporate a two position non-locking switch having a headlight system flash position, a flash OFF position, and a taillight system flash position. The auxiliary means for intermittently and independently activating and deactivating the headlight and taillight system would operate identically to the means for intermittently and independently activating and deactivating the headlight and taillight system. The auxiliary means may be mounted away from the means for intermittently and independently activating and deactivating the headlight and taillight system and in virtually any location in the vehicle compartment. In one specific embodiment the auxiliary means may be mounted on the gear shift. Alternatively, the auxiliary means may be incorporated into the steering wheel.

In a further embodiment, the continuous activation and deactivation means may incorporate a two-position locking switch having a headlight system and taillight system ON position, a lighting OFF position, and a taillight system ON position. Generally, in the evening the switch would be in the headlight system and taillight system ON position thereby illuminating the headlight system and the taillight system. Alternatively, the switch may be located in the taillight system ON position thereby illuminating only the taillight system. An alternative embodiment may utilize a vehicle's original equipment lighting controls in lieu of a separate continuous activation and deactivation means.

The vehicle signaling system also includes a means for obtaining power from the vehicle power system. The power obtaining means may include numerous variations. It may simply electrically connect the vehicles power system to the vehicle signaling system, or may include numerous other electrical devices such as voltage regulators, fuses, capacitors, and resistors. The power obtaining means may include provisions for connecting the vehicle common ground to the vehicle signaling system.

The electrical circuit controlling means accepts inputs from the means for intermittently and independently activating and deactivating the headlight system and the taillight system and the means for continuously activating and deactivating the headlight system and the taillight system and provides outputs to the means for electrically interfacing the electrical circuit controlling means to the headlight system and the taillight system. The electrical circuit controlling means may be constructed with analog or digital devices. In one particular embodiment the electrical circuit controlling means incorporates an integrated circuit, a headlight system current amplification device, and a taillight system current amplification device.

In the specific embodiment utilizing an integrated circuit (IC), the IC may be a standard off the shelf IC that one with skill in the art can select. For example, but not limitation, a standard IC available from Radio Shack® identified as the 74AC86P IC may be used to perform the required functions. Additionally, embodiments utilizing this IC incorporate a means of obtaining a 5V DC power supply. This may be accomplished utilizing a voltage regulator to reduce the vehicle's power supply, typically 12V DC, to the desired 5V DC. Later, the 5V DC output must activate the 12V DC headlight system and taillight system. Often, to accomplish this activation of the headlight system and taillight system current amplification devices are required. Such current amplification devices may often incorporate a resistor and a transistor. The amplified current may then be used to activate the electrical interfacing means.

The electrical interfacing means accepts the control signal from the electrical circuit controlling means and activates and deactivates the headlight system and the taillight system. One of many possible embodiments incorporates a headlight secondary relay and a taillight secondary relay. The headlight secondary relay and the taillight secondary relay may include respective headlight secondary relay coil, taillight secondary relay coil, headlight secondary relay contact, and headlight secondary relay contact.

These variations, modifications, alternatives, and alterations of the various preferred embodiments, arrangements, and configurations may be used alone or in combination with one another as will become more readily apparent to

BRIEF DESCRIPTION OF THE DRAWINGS

Without limiting the scope of the present invention as claimed below and referring now to the drawing and figure:

Figure 1:
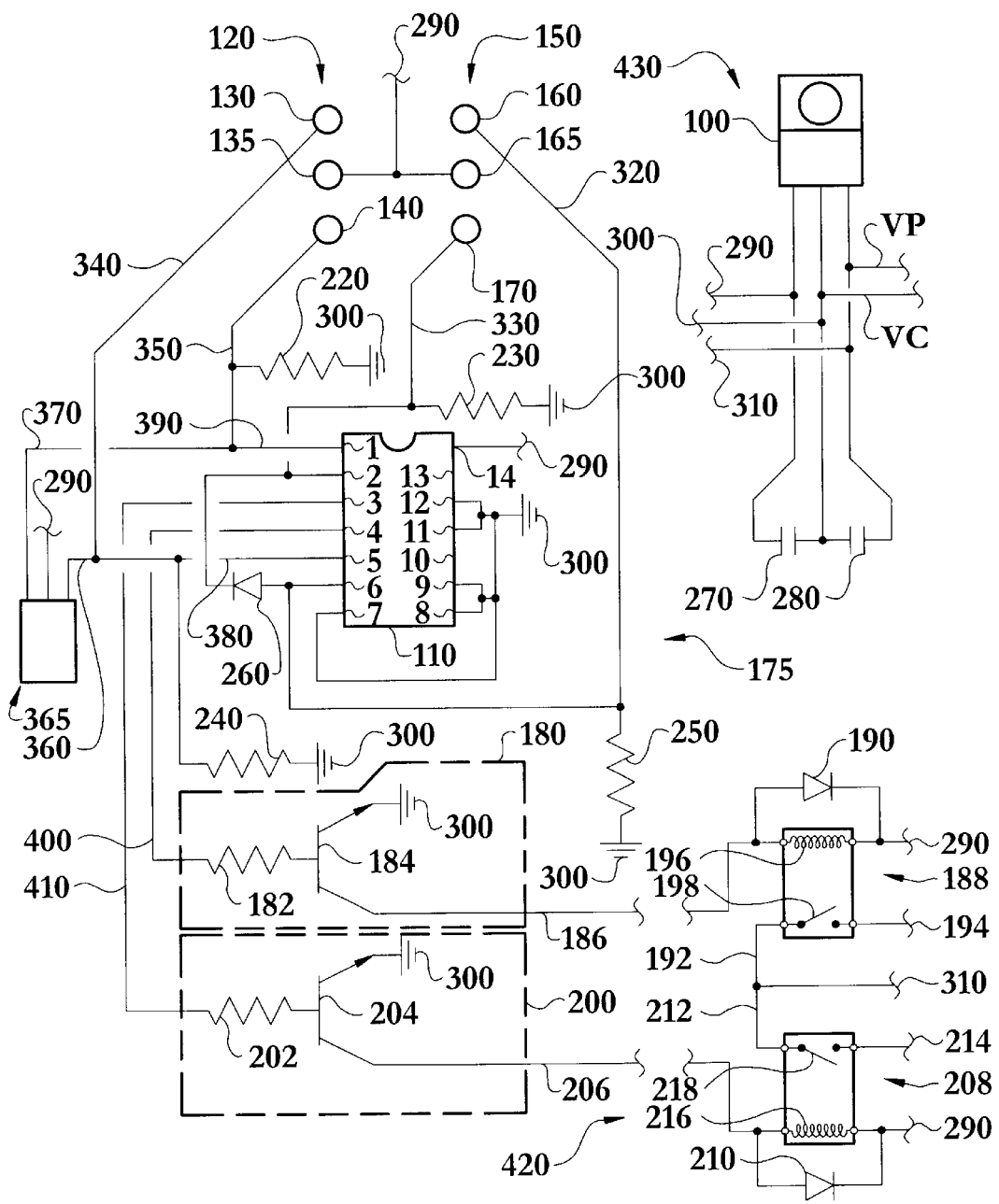
FIG. 1 is a schematic diagram of a circuit arrangement employed in the vehicle signaling system according to the invention.

Also, in the various figures and drawings, the following reference symbols and letters are used to identify the various elements described herein below in connection with the several figures and illustrations: VP and VG.

DESCRIPTION OF THE INVENTION

The vehicle signaling system of the instant invention enables a significant advance in the state of the art. The preferred embodiments of the apparatus accomplish this by new and novel arrangements of elements that are configured in unique and novel ways and which demonstrate previously unavailable but preferred and desirable capabilities.

The detailed description set forth below in connection with the drawing is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

A primary objective of the present invention is to allow selective, and independent, illumination of a vehicle's headlight system, including at least one set of headlights, and a vehicle's taillight system, including at least one set of taillights and optional running lights, regardless of whether the headlight and taillight systems are illuminated. The vehicle signaling system of the present invention may be applied to existing vehicles in a retrofit type of installation, or may be incorporated into the design and manufacture of new vehicles. Similarly, it may be incorporated into trailer lighting systems including, but not limited to, camper trailers, boat trailers, livestock trailers, and equipment trailers.

The selective, and independent, illumination allows an overtaking vehicle and an overtaken vehicle to conveniently and safely signal each other by activating and deactivating the headlight system and the taillight system. The present invention may connect into a vehicle's power source, a vehicle grounding system, a headlight system actuation means, and a taillight system actuation means. Such connections may be easily incorporated into existing vehicles.

With reference now to the accompanying figure, in one of the many preferable configurations, the vehicle signaling system incorporates, among other elements, a means for intermittently and independently activating and deactivating the headlight system and the taillight system 120, a means for continuously activating and deactivating the headlight system and the taillight system 150, a means for obtaining power from the vehicle power system 430, an electrical circuit means 175 for controlling the headlight system and the taillight system by electrically connecting the intermittent activation and deactivation means, the continuous activation and deactivation means 150, and the power attaining means 430, and a means for electrically interfacing 420 the electrical circuit controlling means 175 to the headlight system and the taillight system.

In one particular embodiment, the means for intermittently and independently activating and deactivating the headlight and taillight system 120 may incorporate a two position non-locking switch having a headlight system flash position 130, a flash OFF position 135, and a taillight system flash position 140. Simply moving the switch from the flash OFF position 135 to the headlight system flash position 130 and holding the switch, then letting it return to the flash OFF position 135 will flash the headlight system whether or not the headlight system is presently illuminated, and without having any effect on the illumination of the taillight system. For example, at night when the headlight system and taillight system are illuminated, such action will de-energize the headlights when the switch is held in the headlight system flash position 130, yet the taillight system will remain illuminated and unaffected by the action. Likewise, during the daytime, movement of the switch to the headlight system flash position 130 results in the intermittent illumination of the headlight system, again without affecting the taillight system.

Alternatively, simply moving the switch from the flash OFF position 135 to the taillight system flash position 140 and holding the switch, then letting it return to the flash OFF position 135, will flash the taillight system whether or not the taillight system is presently illuminated, and without having any effect on the illumination of the headlight system. For example, at night when the headlight system and taillight system are illuminated, such action will de-energize the taillight system when the switch is held in the taillight system flash position 140, yet the headlight system will remain illuminated and unaffected by the action. Likewise, during the daytime, movement of the switch to the taillight system flash position 140 results in the intermittent illumination of the taillight system, again without affecting the headlight system.

An additional variation of the present invention includes an auxiliary means for intermittently and independently activating and deactivating the headlight system and the taillight system 365. The auxiliary means for intermittently and independently activating and deactivating the headlight and taillight system 365 may incorporate a two position non-locking switch having a headlight system flash position, a flash OFF position, and a taillight system flash position. The auxiliary means for intermittently and independently activating and deactivating the headlight and taillight system 365 would operate identically to the means for intermittently and independently activating and deactivating the headlight and taillight system 120. The auxiliary means 365 may be mounted away from the means for intermittently and independently activating and deactivating the headlight and taillight system 120 and in virtually any location in the vehicle compartment. In one specific embodiment the auxiliary means 365 may be mounted on the gearshift. Alternatively, the auxiliary means 365 may be incorporated into the steering wheel. Similar to the intermittent and independent lighting activation and deactivation means 120, the auxiliary means 365 accepts a 5V DC power lead 290, in one specific embodiment, and has two outputs; an auxiliary taillight system flash signal lead 370 and an auxiliary headlight system flash signal lead 360. Other variations may use a 12V DC power lead 310.

In a further embodiment, the continuous activation and deactivation means 150 may incorporate a two-position locking switch having a headlight system and taillight system ON position 160, a lighting OFF position 165, and a taillight system ON position 170. Generally, in the evening the switch would be in the headlight system and taillight system ON position 160 thereby illuminating the headlight system and the taillight system. Alternatively, the switch may be located in the taillight system ON position 170 thereby illuminating only the taillight system. An alternative embodiment may utilize a vehicle's original equipment lighting controls in lieu of a separate continuous activation and deactivation means 150.

The vehicle signaling system also includes a means for obtaining power 430 from the vehicle power system VP. The power obtaining means 430 may include numerous variations. It may simply electrically connect the vehicles power system VP to the vehicle signaling system, or may include numerous other electrical devices such as voltage regulators 100, fuses, capacitors 270, 280, and resistors. The power obtaining means may include provisions for connecting the vehicle common ground VG to the vehicle signaling system.

The electrical circuit controlling means 175 accepts inputs from the means for intermittently and independently activating and deactivating the headlight system and the taillight system 120 and the means for continuously activating and deactivating the headlight system and the taillight system 150 and provides outputs to the means for electrically interfacing 420 the electrical circuit controlling means 175 to the headlight system and the taillight system. The electrical circuit controlling means 175 may be constructed with analog or digital devices. In one particular embodiment the electrical circuit controlling means 175 incorporates an integrated circuit 110, a headlight system current amplification device 180, and a taillight system current amplification device 200.

In the specific embodiment utilizing an integrated circuit (IC) 110, the IC 110 may be a standard off the shelf IC 110 that one with skill in the art can select. For example, but not limitation, a standard IC 110 available from Radio Shack® identified as the 74AC86P IC may be used to perform the required functions. Additionally, embodiments utilizing this IC 110 incorporate a means of obtaining a 5V DC power supply. This may be accomplished utilizing a voltage regulator 100 to reduce the vehicle's power supply VP, typically 12V DC, to the desired 5V DC. Later, the 5V DC output must activate the 12V DC headlight system and taillight system. Often, to accomplish this activation of the headlight system and taillight system current amplification devices 180, 200 are required. Such current amplification devices 180, 200 may often incorporate a resistor 182, 202 and a transistor 184, 204. The illustrated embodiment incorporates NPN transistors. Each current amplification device 180, 200 is also electrically connected to the device common ground 300. The amplified current may then be used to activate the electrical interfacing means 420.

In this embodiment the IC 110 is a 14 PIN IC 110, with 14 terminals 1, 2, 3, 4, 5, 6, 7, 8, 9, 10, 11, 12, 13, and 14. The first terminal 1 of the IC 110 accepts a secondary taillight system flash signal lead 390, which joins an auxiliary taillight system flash signal lead 370 from the auxiliary intermittent and independent lighting activation and deactivation means 365 and a primary taillight system flash signal lead 350 from the taillight system flash position 140. The secondary taillight system flash signal lead 390 is connected to the device common ground 300 through the taillight system flash signal ground resistor 220.

The second terminal 2 of the IC 110 accepts a taillight system signal lead 330, input from a blocking diode 260, and a connection to the device common ground 300 through the taillight system signal ground resistor 230. The third terminal 3 of the IC 110 provides an output taillight system signal lead 410 that electrically connects to the taillight system current amplification device 200. Similarly, the fourth terminal 4 of the IC 110 provides an output headlight system signal lead 400 that electrically connects to the headlight system current amplification device 180. The fifth terminal 5 of the IC 110 accepts input from a secondary headlight system flash signal lead 380, which joins an auxiliary headlight system flash signal lead 360 from the auxiliary intermittent and independent lighting activation and deactivation means 365 and a primary headlight system flash signal lead 340 from the headlight system flash position 130. The secondary headlight system flash signal lead 380 is connected to the device common ground 300 through the headlight system flash signal ground resistor 240. The sixth terminal 6 of the IC 110 accepts a headlight system signal lead 320, and a connection to the device common ground 300 through the headlight system signal ground resistor 250. The headlight system signal lead 320 also provides an input to the blocking diode 260, which allows power to pass to the second terminal 2 when the continuous lighting activation and deactivation system 150 is in the headlight and taillight ON position 160, rather than the taillight ON position 170, but not vice versa. The seventh terminal 7, the eighth terminal 8, the ninth terminal 9, the eleventh terminal 11, and the twelfth terminal 12 are unused input terminal in this embodiment and are therefore connected to the device common ground 300. The tenth terminal 10 and the thirteenth terminal 13 are unused output terminals. The fourteenth terminal 14 accepts a 5V DC device power lead 290.

The electrical interfacing means 420 accepts control signals including a headlight system amplified lead 186 and a taillight system amplified lead 206 from the electrical circuit controlling means 175 and activates and deactivates the headlight system and the taillight system. One of many possible embodiments incorporates a headlight secondary relay 188 and a taillight secondary relay 208. The headlight secondary relay 188 and the taillight secondary relay 208 may include respective headlight secondary relay coil 196, taillight secondary relay coil 216, headlight secondary relay contact 198, and headlight secondary relay contact 218. In one specific embodiment the headlight secondary relay coil 196 electrically connects the headlight system amplified lead 186 and the 5V DC power lead 290. Similarly, the taillight secondary relay coil 216 electrically connects the taillight system amplified lead 206 and the 5V DC power lead 290. Additionally, the headlight system secondary relay contact 198 electrically connects the headlight system secondary relay 12V power lead 192 and the headlight system primary relay lead 194. Similarly, the taillight system secondary relay contact 218 electrically connects the taillight system secondary relay 12V power lead 212 and the taillight system primary relay lead 214. The headlight system secondary relay 12V power lead 192 and the taillight system secondary relay 12V power lead 212 are electrically connected to the device 12V DC power lead 310. Further, a headlight system secondary relay diode 190 electrically connects the headlight system amplified lead 186 and the 5V DC device power lead 290 and a taillight system secondary relay diode 210 electrically connects the headlight system amplified lead 206 and the 5V DC device power lead 290. The headlight system primary relay lead 194 may then be electrically connected to control elements in the headlight system to control the illumination of the headlight system. Similarly, the taillight system primary relay lead 214 may then be electrically connected to control elements in the taillight system to control the illumination of the taillight system.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations for compatibility with the plurality of commercially available basketball goals. Accordingly, even though only few variations of the present invention are described herein, it is to be understood that the practice of such additional modifications and variations and the equivalents thereof, are within the spirit and scope of the invention as defined in the following claims.

The corresponding structures, materials, acts, and equivalents of all means or step plus function elements in the claims below are intended to include any structure, material, or acts for performing the functions in combination with other claimed elements as specifically claimed.

I claim:

1. A vehicle signaling system for selectively illuminating a headlight system, including at least one set of headlights, and a taillight system, including at least one set of taillights and optional running lights, of a vehicle of the type having a vehicle power source with a vehicle power system potential, a vehicle grounding system, a headlight system actuation means, and a taillight system actuation means, thereby vehicles to conveniently and safely signal each other by illuminating the headlight system and taillight system, comprising:

a means for obtaining power from the vehicle power system including a voltage regulator to regulate the vehicle power system potential to a predetermined device potential;

a two position non-locking switch having a headlight system flash position, a flash OFF position, and a taillight system flash position to intermittently and independently produce a headlight system flash signal and a taillight system flash signal utilizing the predetermined device potential;

a two position locking switch having a headlight system and taillight system ON position, a lighting OFF position, and a taillight ON position to produce a continuous headlight and taillight illumination signal and a continuous taillight illumination signal utilizing the predetermined device potential;

an integrated circuit that receives the headlight system flash signal, the taillight system flash signal, the continuous headlight and taillight illumination signal, the continuous taillight illumination signal, the predetermined device potential, and produces a headlight system signal and a taillight system signal;

a headlight system current amplification device for receiving and amplifying the headlight system signal to produce an amplified headlight system signal;

a taillight system current amplification device for receiving and amplifying the taillight system signal to produce an amplified taillight system signal;

a headlight system secondary relay receiving the vehicle power system potential, the amplified headlight system signal, the predetermined device potential, and producing a headlight system primary relay signal to activate and deactivate the headlight system;

a taillight system secondary relay receiving the vehicle power system potential, the amplified taillight system signal, the predetermined device potential, and producing a taillight system primary relay signal to activate and deactivate the taillight system; and a plurality of resistive loads to electrically connect the headlight system flash signal, the taillight system flash signal, the continuous headlight and taillight illumination signal, and the continuous taillight illumination signal to the vehicle grounding system.

2. The system according to claim 1, further including an auxiliary means for intermittently and independently activating and deactivating the headlight system and the taillight system.

3. The system according to claim 1, further including a blocking diode electrically connecting the continuous headlight and taillight illumination signal to the continuous taillight illumination signal.

4. The system according to claim 1, further including a headlight system secondary relay diode electrically connecting the amplified headlight system signal and the predetermined device potential, and a taillight system secondary relay diode electrically connecting the amplified taillight system signal and the predetermined device potential.

* * * * *